United States Patent Office 2,934,502
Patented Apr. 26, 1960

2,934,502

COMPOSITIONS COMPRISING HEXAPHENOXY DISILYL BENZENE

Herbert C. Kaufman, New Haven, Conn., assignor to John B. Pierce Foundation, New York, N.Y., a corporation of New York No Drawing. Application October 16, 1956
Serial No. 616,126

11 Claims. (Cl. 252—78)

This invention relates to a fluid medium adapted to be used in the transfer of heat (as a lubricant, and as a hydraulic fluid. It relates in particular to liquid organo-silicon compounds.

The criteria for a heat transfer medium include low starting viscosity, which has a practical bearing on its value as a heat transfer medium; high boiling point, which enables the material to be used at the high temperatures which are required for many of the present day industrial needs; and thermal stability, which permits the use of the material over a long period of time and at elevated temperatures.

Liquid heat transfer media which have the desired combination of properties of chemical stability at high temperature and fluidity at low temperature have long been sought. The Johnson U.S. Patent No. 2,335,012 discloses as a heat transfer medium mixtures of tetra aryl orthosilicates. The Morgan et al. U.S. Patent No. 2,674,579 discloses mixtures of certain phenyl aryloxy silanes prepared by the reaction of phenyltrichlorosilane with an equimolecular mixture of phenol and cresol. All of these compounds however suffer the disadvantage of having a high viscosity after prolonged heating at high temperature, probably caused by decomposition and polymerization.

In my co-pending patent application Serial No. 569,265 which was filed March 5, 1956, now U.S. Patent No. 2,834,736, I describe and claim the compound hexaphenoxy ortho, meta or para disilyl benzene having the following structural formula:

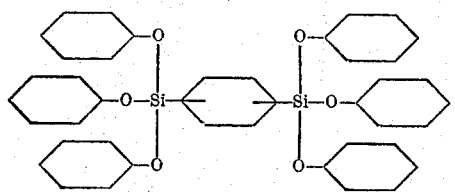

and its use in the transferring of heat. This material has the rare property of decreasing in viscosity upon heating. However, it would be desirable to have a material which has a lower initial viscosity than the hexaphenoxy disilyl benzene. Although certain high temperature heat transfer fluids having a low initial viscosity are known at the present time, such liquids increase rapidly in viscosity during use due to polymerization or other causes as heretofore indicated.

Accordingly, it is an object of the present invention to supply a material which has a low initial viscosity and meets the other criteria of a heat transfer fluid so that it may be successfully used in heat transmission, as a lubricant and as a hydraulic fluid.

Other objects and advantages of the invention will appear from the following description.

The product which fulfills the objects and provides the advantages of the invention is a mixture of hexaphenoxy disilyl benzene which is described in my co-pending application Serial No. 569,265 referred to heretofore, and a normally solid (i.e. at 25° C.) organic silicic ester having the following formula $(R')_y$—Si—$(O$—$R)_x$ where R is an aryl group, or aralkyl group of the formula —$(CH_2)_n$—R'', R' is hydrogen, aryl or aralkyl of the formula —$(CH_2)_n$—R, $n$ is 1 or 2, R'' is an aryl group, $x$ is 1 to 4, $y$ is 0 to 3, and the sum of $x$ and $y$ is 4. Preferably, R, R' and R'' are aryl groups in which the sole aromatic nucleus is the benzene ring. Some examples of these organic silicic esters are triphenyl phenoxy silane, diphenyl diphenoxy silane, phenyl triphenoxy silane, triphenoxy silane, and tetra phenoxy silane (tetraphenyl ortho-silicate). The phenyl groups of the compounds just referred to may also be substituted entirely or in part by other aryl groups such as cresyl, xylenyl, benzyl, p-phenoxy phenyl, etc. Another compound which produces liquid mixtures with the hexaphenoxy disilyl benzene having lower viscosity than the latter compound alone is hexaphenoxy disilyl ethane

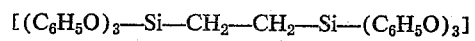

Still another such compound is tetra cyclohexyl silicate.
The invention provides mixtures which unexpectedly have a lower initial viscosity than the liquid hexaphenoxy disilyl benzene, by adding a solid to such liquid. Moreover, in most instances, the mixtures retain the characteristic decrease in viscosity on heating of the hexaphenoxy disilyl benzene.

In order to preserve the fluidity of the mixture and prevent crystallization or solidification, at ordinary temperatures, the amount of hexaphenoxy disilyl benzene in the mixture is maintained at least 40 mol percent based on the mixture thereof with the normally solid silicic ester and in the case of some of the mixtures of the invention, somewhat larger amounts of hexaphenoxy disilyl benzene may be required in order to prevent crystallization. Still larger amounts of the hexaphenoxy disilyl benzene of course may be used, but in order to effect a significant decrease in initial viscosity and also for economical reasons it is preferred to add at least 10 mol percent of the normally solid organic silicic ester to the mixture, i.e., to limit the amount of hexaphenoxy disilyl benzene to not greater than 90 mol percent. The mixtures of the invention may be prepared by either of two methods designated herein as method "A" and method "B."

According to method "A," a physical mixture of the liquid hexaphenoxy disilyl benzene and the solid silicic ester is prepared and heated for about twenty-four hours at a temperature above 300° C. A vacuum is preferably applied to the mixture after this heating process whereby any low boiling impurities will be removed.

The preferred method ("B") of preparing the mixture is to react a mixture of hexachloro disilyl benzene and the chlorosilane corresponding with the particular organic silicic ester to be used, with a stoichiometric excess amount of phenol or alcohol having the aryl or aralkyl group that is to be introduced to the components of the mixture. This process may be carried out by the method described in my co-pending application Serial No. 569,265. Hydrogen chloride is liberated, and the mixture is refluxed and then stripped of low boilers while it is heated under vacuum.

The following examples illustrate methods for preparing the mixtures of the invention and show the superiority of such mixtures over other known heat transfer liquids.

EXAMPLE I

536 grams (5.7 mols) of phenol were melted and poured into a round-bottomed flask equipped with a dry ice-cooled reflux condenser leading to a fume hood. The flask was also equipped with a paddle-type motor driven stirrer and a dropping funnel fitted with a calcium chloride drying tube. 122 grams (0.5 mol) of hexachloro disilyl benzene (a mixture of the meta and para isomers, a commercially available material) were melted at 45° C. and added to 85 grams (0.5 mol) of silicon tetrachloride at 30° C. The resulting mixture was poured into the dropping funnel and thence added slowly to the well-stirred phenol. An endothermic reaction ensued with the liberation of hydrogen chloride. After all the chorosilanes had been added, heat was applied slowly to the bottom of the round-bottomed flask so as not to lose any silicon tetrachloride, which boils at 57.6° C. Temperature was gradually increased to the refluxing temperature of 320° C. and was maintained at this level for twenty-four hours to insure the removal of all of the hydrogen chloride. The flask was then cooled and vacuum was applied, thereby to remove low boiling materials such as excess phenol. The pressure was maintained at about 0.5 of mercury and the head temperature at 195° C. during this stripping process. After stripping, the residue was cooled to 100° C. and filtered through dry "Celite," an inert diatomaceous silica filter-aid. The filtrate was a clear brown liquid. The product, which was an equimolecular mixture of hexaphenoxy disilyl benzene and tetraphenoxy silane, had a viscosity at 77° F. measured by the Fenske method of 63.0 centistokes. Its boiling point was 815° F. The yield was 93%. The mixture showed no sign of crystallization after having been maintained at 37° F. for three months. Completely liquid mixtures of tetraphenoxy silane and hexaphenoxy disilyl benzene containing as much as 60 mol percent of the tetraphenoxy silane may be prepared without the formation of any crystals on standing at 25° C.

EXAMPLE II

Method "A" for the preparation of the mixtures of the invention was carried out by mixing 345 grams (0.5 mol) of hexaphenoxy disilyl benzene and 200 grams (0.5 mol) of melted tetraphenoxy silane. The mixture was heated for twenty-four hours at 360° C. and was then cooled and stripped of any low boiling impurities by heating it under a vacuum of 0.5 mm. of mercury absolute pressure and a pot temperature of 200° C. The residue was cooled to about 100° C. and filtered through dry "Celite" as in Example I. The clear, brown-colored liquid product had a boiling point of 815° F. and a viscosity at 77° F. of 62.0 cs.

EXAMPLE III

Comparison viscosity and aging tests were carried out on hexaphenoxy disilyl benzene (a mixture of meta and para isomers prepared by the method of Example II) (Test 1), a 50–50 mol ratio mixture of tetraphenoxy silane and hexaphenoxy (m,p) disilyl benzene (Test 2), and a 60–40 mol ratio mixture of phenyl triphenoxy silane and phenyl tricresoxy silane (Test 3). The tests were carried were carried out by placing a sample of each liquid in a cylindrical tube having a narrow neck ending in a 2 mm. internal diameter capillary tube. An iron strip was placed in the liquid to simulate industrial conditions in actual heat transfer systems. The tubes were then placed in a fused nitrate-nitrtite salt bath maintained at 700° F. Samples of the liquid were taken periodically by removing the tube from the bath, cooling it, and withdrawing a sample for a viscosity measurement at 770° F. The results of the aging and viscosity tests are presented in the following Table 1. The superscripts appearing in the table refer to the number of days of continuous heating at 700° F., while the base numbers are the viscosity measurements in centistokes.

*Table 1*

| Test No. | Molal Ratio | Compound or Mixture | Initial Viscosity, degrees | Viscosity at 25° C. after Heating at 700° F. | | | | | | | |
|---|---|---|---|---|---|---|---|---|---|---|---|
| 1 | | $(\phi O)_3 Si\phi Si(O\phi)_3$ | 228 | $154^{10}$ | $134^{26}$ | $136^{36}$ | $137^{42}$ | $150^{52}$ | $314^{74}$ | $256^{110}$ | $1,000^{120}$ |
| 2 | 1/2, 1/2 | $Si(O\phi)_4$, $(\phi O)_3 Si\phi Si(O\phi)_3$ | 63 | $52^6$ | $47^{17}$ | $74^{49}$ | $98^{76}$ | | | | |
| 3 | 3/5, 2/5 | $\phi Si(O\phi)_3$, $\phi Si(O\phi CH_3)_3$ | 55 | $59^4$ | $89^{11}$ | $234^{26}$ | $510^{33}$ | $1,730^{46}$ | | | |

It will be noted from Table 1 that the hexaphenoxy disilyl benzene in Test 1 had a high initial viscosity but decreased in viscosity as time progressed during the test, while the mixture of the invention as in Test 2 exhibited not only the decrease in viscosity with time, but also the unexpected low initial viscosity. In Test 3 a known heat transfer liquid had an initial low viscosity but rapid increase in viscosity was found to occur upon heating.

EXAMPLE IV

A mixture of phenyl triphenoxy silane (melting point 48° C.) and hexaphenoxy disilyl benzene in the mol ratio of 0.30 to 0.70 respectively was prepared by Method A described above. The viscosity of the pure hexaphenoxy disilyl benzene was 216 centistokes and the mixture (which was completely liquid at 25° C.) had an initial viscosity of 161 cs. After heat treatment at 700° F. for nine days the viscosity of the mixtures was 121 cs. Completely liquid mixtures of these two materials containing as much as 40 mol percent of phenyl triphenoxy silane may be prepared without the formation of any crystals in the mixture upon standing at 25° C.

EXAMPLE V

A mixture of diphenyl diphenoxy silane (melting point 71° C.) and hexaphenoxy disilyl benzene in the mol ratio of 50 to 50 was prepared by Method A. The viscosity of the pure hexaphenoxy disilyl benzene was 216 cs. and the mixture (which was completely liquid at 25° C.) had an initial viscosity of 200 cs. After heat treatment at 700° F. for nine days the viscosity of the mixture was 157 cs.

EXAMPLE VI

A mixture of triphenyl phenoxy silane (melting point 105° C.) and hexaphenoxy disilyl benzene in the mol ratio of 0.23 to 0.77, respectively, was prepared by Method A. The viscosity of the hexaphenoxy disilyl benzene before mixing was 216 cs. and the mixture (which was completely liquid at 25° C.) had a viscosity of 185 cs.

EXAMPLE VII

A mixture of tetra-p-cresyl silicate (melting point 69° C.) and hexaphenoxy disilyl benzene in the mol ratio of 0.40 to 0.60, respectively, was prepared by Method A. The viscosity of the hexaphenoxy disilyl benzene before mixing was 216 cs. and the mixture (which was completely liquid at 25° C.) had an initial viscosity of 92.6 cs. After heat treatment at 700° F. for nine days the viscosity of the mixture was 53.9 cs., and 52.2 cs. after 43 days at 700° F. Completely liquid mixtures (at 25° C.) can be made containing up to about 50 mol percent of this solid.

EXAMPLE VIII

A mixture of tetra cyclohexyl silicate (melting point 90° C.) and hexaphenoxy disilyl benzene in the mol ratio of .15 to .85, respectively, was prepared by Method A. The viscosity of the hexaphenoxy disilyl benzene before mixing was 216 cs. and the mixture (which was completely liquid at 25° C.) had an initial viscosity of 178 cs. After heat treatment at 700° F. for three days the viscosity of the mixture was 178 cs.

EXAMPLE IX

A mixture of tetra thymyl silicate (melting point 48° C.) and hexaphenoxy disilyl benzene (initial viscosity 216 cs. before mixing) in the mol ratio of .40 to .60, respectively, was prepared by Method A. The mixture (which was completely liquid at 25° C.) had an initial viscosity of 69.3 cs. After heat treatment at 700° F. for thirteen days the viscosity of the mixture was 120 cs. Completely liquid mixtures (at 25° C.) can be made containing up to about 50 mol percent of this solid.

EXAMPLE X

A mixture of tetrabenzyl silicate (melting point 32° C.) and hexaphenoxy disilyl benzene (initial viscosity before mixing 216 cs.) in the mol ratio of 0.40 to 0.60, respectively, was prepared by Method A. The mixture (which was completely liquid at 25° C.) had an initial viscosity of 59.7 cs. After heat treatment at 700° F. for eight days the viscosity of the mixture was 77 cs. Completely liquid mixtures of these two materials can be prepared with an amount of tetrabenzyl silicate as high as 50 mol percent.

EXAMPLE XI

A mixture of triphenoxy silane (melting point 55° C.) and hexaphenoxy disilyl benzene (initial viscosity before mixing 216 cs.) in the mol ratio of .50 to .50 was prepared by Method A. The mixture (which was completely liquid at 25° C.) had an initial viscosity of 66 cs. After heating at 700° F. for thirteen days the viscosity of the mixture was 62 cs. Completely liquid mixtures (at 25° C.) can be made containing more than 50 mol percent of this solid.

EXAMPLE XII

A mixture of hexaphenoxy disilylethane (melting point 88° C.) and hexaphenoxy disilyl benzene (initial viscosity before mixing 216 cs.) in the mol ratio of .15 to .85 was prepared by Method A. The mixture (which was completely liquid at 25° C.) had an initial viscosity of 185 cs. After heat treatment at 700° F. for three days the viscosity of the mixture was 180 cs.

Although specific embodiments of the invention have been described herein and in the foregoing examples, it is intended to cover within the scope of the appended claims all modifications and equivalents within the spirit and teaching of the invention. For example, the new heat transfer liquids of the invention may be used advantageously in the transmission of heat as a "transport" fluid, i.e., a fluid may be circulated through a boiler or other heating medium to the location where heat is needed and then returned to the boiler for reheating, whether it be high-grade heat for chemical processing, or low-grade space heat used, e.g., in heating homes or offices.

I claim:

1. A mixture that is completely liquid at ordinary temperatures and is adapted to be used as a hydraulic fluid and in heat transmission, consisting essentially of a mixture of at least 40 mol percent of hexaphenoxy disilyl benzene having the following formula

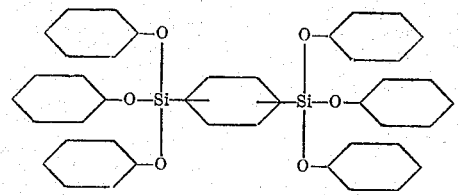

and the remainder, at least 10 mol percent, of a normally solid material of the class consisting of (1) compounds having the structural formula $$(R')_y\text{---Si---}(O\text{---R})_x$$

where R is of the class consisting of aralkyl groups of the formula $-(CH_2)_n-R''$ and aryl groups, R' is of the class consisting of aralkyl groups of the formula $$-(CH_2)_n-R''$$

aryl groups and hydrogen, $n$ is 1 to 2, R'' is an aryl group, $x$ is 1 to 4, $y$ is 0 to 3, and the sum of $x$ and $y$ is 4, (2) hexaphenoxy disilylethane, and (3) tetracyclohexyl orthosilicate.

2. A mixture as described in claim 1 wherein said normally solid material has the structural formula $$(R')_y\text{---Si---}(O\text{---R})_x$$

and the symbols have the meanings therein assigned.

3. A mixture as described in claim 1 wherein said normally solid material is hexaphenoxy disilylethane in an amount not exceeding about 15 mol percent of the mixture.

4. A mixture as described in claim 1 wherein said normally solid material is tetra cyclohexyl orthosilicate in an amount not exceeding 15 mol percent of the mixture.

5. A mixture as described in claim 2 wherein R, R' and R'' are aryl groups in which the sole aromatic nucleus is the benzene ring.

6. A mixture as described in claim 5 wherein R and R' are phenyl groups.

7. A mixture as described in claim 5 wherein $x$ is 4, $y$ is 0 and R is the cresyl group.

8. A mixture as described in claim 5 wherein $x$ is 2, $y$ is 2 and R and R' are phenyl groups.

9. A mixture as described in claim 6 wherein $x$ is 4 and $y$ is zero.

10. A mixture as described in claim 6 wherein $x$ is 2 and $y$ is 2.

11. A mixture as described in claim 6 wherein $x$ is 3 and $y$ is 1.

References Cited in the file of this patent

UNITED STATES PATENTS

| | | |
|---|---|---|
| 2,584,334 | DaFano | Feb. 5, 1952 |
| 2,624,721 | Hatcher et al. | Jan. 6, 1953 |
| 2,674,579 | Morgan et al. | Apr. 6, 1954 |
| 2,713,064 | Weyenberg | July 12, 1955 |

OTHER REFERENCES

"Organo-Metallic and Organo-Metalloid High-Temperature Lubricants and Related Materials," by H. Gilman, WADC Technical Report 53-426, Part II, Wright Air Development Center U.S.A.F., Wright-Patterson Air Force Base, Ohio, pp. 74–77 (April 1955).

UNITED STATES PATENT OFFICE

CERTIFICATE OF CORRECTION

Patent No. 2,934,502                April 26, 1960

Herbert C. Kaufman

It is hereby certified that error appears in the printed specification of the above numbered patent requiring correction and that the said Letters Patent should read as corrected below.

Column 3, line 4, for "30° C." read -- 20° C. --; line 28, after "0.5" insert -- mm. --; line 67, strike out "were carried", first occurrence; column 4, line 1, for "770° F." read -- 77° F. --; line 35, for "mixtures" read -- mixture --.

Signed and sealed this 20th day of September 1960.

(SEAL)

Attest:

KARL H. AXLINE
Attesting Officer

ROBERT C. WATSON
Commissioner of Patents